United States Patent [19]

Boswell et al.

[11] 4,094,295

[45] June 13, 1978

[54] CHARCOAL AND WATER SMOKER AND COOKER

[75] Inventors: Burl Boswell; Heyman J. Manhein, both of Shreveport, La.

[73] Assignee: Bosman Industries, Inc., Shreveport, La.

[21] Appl. No.: 700,136

[22] Filed: Jun. 28, 1976

[51] Int. Cl.² .......................... A47J 37/04; F24B 3/00
[52] U.S. Cl. ..................................... 126/25 R; 99/444;
99/446; 126/9 R; 126/275 R
[58] Field of Search ................ 99/444, 446, 343, 482;
126/25 R, 25 A, 9 R, 275 R, 273 R, 273.5

[56] References Cited

U.S. PATENT DOCUMENTS

| 418,119 | 12/1889 | Fricker | 126/273 R |
|---|---|---|---|
| 1,725,521 | 8/1929 | Keiner | 126/25 R |
| 2,254,570 | 9/1941 | Hailey | 99/343 X |
| 3,049,071 | 8/1962 | Diack | 99/446 X |
| 3,289,571 | 12/1966 | Lewis | 99/446 X |
| 3,299,800 | 1/1967 | Angelo | 99/446 X |
| 3,327,698 | 6/1967 | Leslie | 126/25 R |
| 3,776,127 | 12/1973 | Muse | 99/482 |

FOREIGN PATENT DOCUMENTS

| 143,973 | 7/1881 | France | 126/25 R |
|---|---|---|---|
| 568,198 | 10/1957 | Italy | 126/25 R |

*Primary Examiner*—William F. O'Dea
*Assistant Examiner*—Harold Joyce
*Attorney, Agent, or Firm*—Clarence A. O'Brien; Harvey B. Jacobson

[57] ABSTRACT

A charcoal-water smoker and cooker in which water separates the coals formed by charcoal briquettes and the meat, vegetables or other items being cooked and which includes a generally cylindrical body supporting a water pan and one or more supporting grilles with a base pan supporting the main body and also supporting a charcoal liner or pan for receiving a quantity of charcoal briquettes with the upper end of the main body being closed by a dome having a combined handle and heat indicator incorporated therein at the apex thereof. The main body is provided with a pair of diametrically opposed handles which enables the main body along with the water pan, grilles and dome to be lifted off of the base pan and charcoal liner in order to enable the charcoal to be replenished if necessary. The water pan and grille or grilles are supported interiorly of the main body by vertically spaced radially inwardly extending supporting clips.

7 Claims, 6 Drawing Figures

CHARCOAL AND WATER SMOKER AND COOKER

BACKGROUND OF THE INVENTION

1. Field of the Invention

The present invention generally relates to a charcoal-water smoker and cooker in which charcoal briquettes are utilized to smoke and cook meat or other items positioned above the charcoal with a pan of water disposed between the charcoal and the items being cooked.

2. Description of the Prior Art

Many devices are available by which food items such as meat, vegetables and the like may be cooked by supporting such items in overlying relation to charcoal briquettes with the heat from the coals cooking the food items. The food items are usually placed on a grille which can be vertically adjustable in relation to the hot coals in order to vary the rate of cooking of the food items. Additionally, many devices are available in which containers are provided for supporting the items being cooked and the charcoal briquettes with flavoring agents such as wood chips, sticks or the like being added to the charcoal to smoke the food items to introduce a particular flavor characteristic thereto. In most such devices, the person using the device estimates the amount of charcoal which will be needed and places it in the charcoal pan and ignites it by using various available starting aids and after the charcoal has burned for a short time, the remainder of the apparatus is assembled and the cooking operation commences. Usually, the cooking operation requires that the meat items be basted or inverted from time to time in order to obtain even cooking on both sides and proper interior cooking. Frequently, due to inattention, the meat items will not be turned or basted thus sometimes resulting in the meat items being burned which deteriorates the taste characteristics of the meat items when they are eaten. In the event insufficient charcoal was placed in the pan to properly and completely cook the meat items, it is necessary to remove the grille from above the charcoal pan, replenish the supply of charcoal, re-ignite the charcoal and replace the grille. This is a difficult procedure and sometimes results in food items being dropped off the grille and sometimes results in undercooked or overcooked food items. In addition, there is a substantial danger of burns especially where liquid charcoal starters are utilized to expedite the burning of the added charcoal which requires that the liquid fire starter be sprayed against hot surfaces.

SUMMARY OF THE INVENTION

An object of the present invention is to provide a charcoal-water smoker and cooker in which a pan of water is supported in a tubular body having a pan of charcoal briquettes in underlying relation thereto and a grille or grilles in overlying relation thereto with the upper end of the tubular body being closed by a dome-like lid.

Another object of the invention is to provide a smoker and cooker in which the dome-like lid is provided with a handle and heat indicator incorporated therein at the apex thereof for indicating the temperature in the upper end of the body.

A further object of the invention is to provide a smoker and cooker in accordance with the preceding objects in which the tubular body includes a main body with vertical channels on the inner surface thereof with one flange of the channel including extensions in the form of clips for supporting the peripheral edge of the water pan and the peripheral edge of a grille with each of the clips including radially disposed and vertically spaced ledges for this purpose.

Still another object of the invention is to provide a smoker and cooker having a main body separate from a base pan which supports the charcoal pan or liner in which the main body is separate therefrom and rests on the base pan and charcoal liner so that the main body along with the water pan, grilles, food items and lid can be lifted off of the charcoal liner to enable the supply of charcoal to be replenished with the main body having diametrically opposed insulated handles for this purpose.

Still another important object of the present invention is to provide a smoker and cooker in accordance with the preceding objects in which the food items do not have to be basted or turned over at intervals since the water pan with water therein interposed between the food items and the burning charcoal briquettes will thoroughly cook the food items without basting or without turning over.

Yet another important object of the present invention is to provide a smoker and cooker which is attractive in appearance, simple in construction, effective for cooking various types of food products and relatively inexpensive to manufacture and use.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
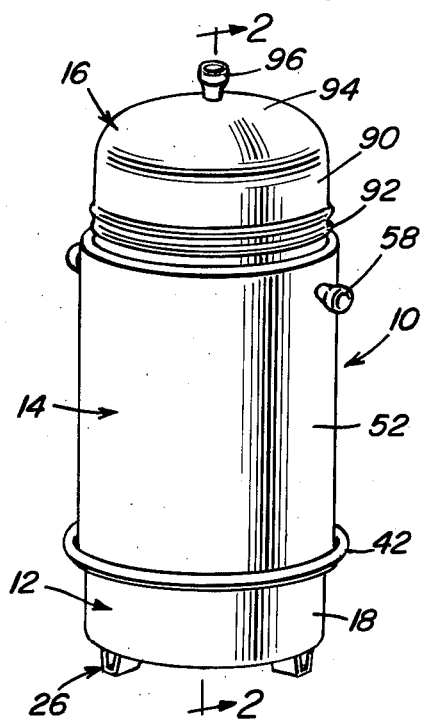
FIG. 1 is a perspective view of the charcoal-water smoker and cooker of the present invention.
Figure 3:
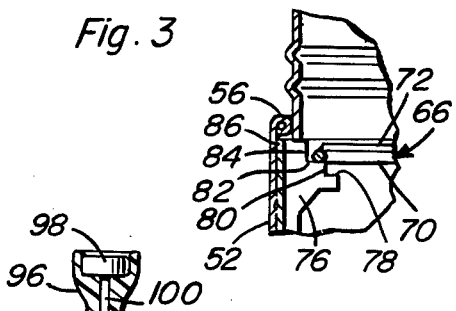
FIG. 3 is a fragmental sectional view taken substantially upon a plane passing along section line 3—3 on FIG. 2 illustrating the association of the main body and lid together with the upper clips supporting the upper grille.

Referring now specifically to the drawings, the charcoal-water smoker and cooker of the present invention is generally designated by the numeral 10 and is illustrated in FIG. 1 in assembled relation and includes a base pan generally designated by numeral 12, a main body generally designated by numeral 14 and a lid generally designated by numeral 16.

The base pan 10 includes a substantially cylindrical peripheral wall 18 and a substantially flat bottom 20 constructed of sheet metal with the upper edge of the wall 18 being rolled outwardly to form a bead 22 to rigidify the wall 18 and to eliminate a sharp upper edge. The center of the bottom 20 is provided with a relatively small opening 24 therein which may be in the form of a circular opening. The bottom 20 is also provided with a plurality of supporting legs 26 which are relatively short in vertical height and each of which is in the form of a U-shaped member having a flat bottom bight portion 28 and upwardly diverging legs or plates 30 having reduced end portions extending through corresponding slots in the bottom 20 with the upper ends of the legs 32 then being bent laterally as at 32 thus locking the supporting legs 26 to the base pan 12.

Figure 2:
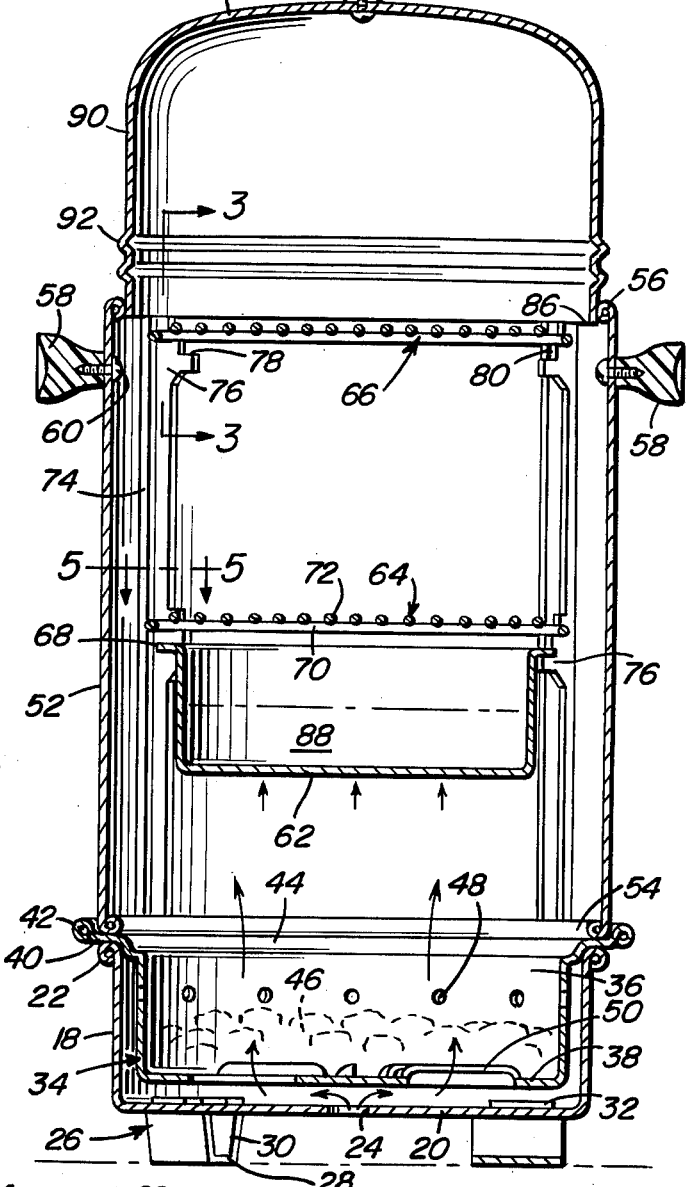
FIG. 2 is a vertical sectional view, on an enlarged scale, taken substantially upon a plane passing along section line 2—2 of FIG. 1 illustrating the structural details and relationships of the components of the device.

Positioned in the base pan 12 is a charcoal liner or pan generally designated by numeral 34 which includes a cylindrical peripheral wall 36 spaced inwardly of and concentrically of the wall 18. The charcoal liner 34 also includes a bottom wall 38 spaced above the bottom wall 20 of the base pan 12. The upper edge of the peripheral wall 36 is provided with an outwardly extending peripheral flange 40 which overlies and supportingly engages the bead 22 at the upper edge of the peripheral wall 18 of the base pan 12 thus supporting the charcoal liner 34 from the base pan 12. The outer edge of the flange 40 on the charcoal liner or pan is also provided with a reversely folded bead 42 which reinforces and rigidifies the charcoal liner 34 and also eliminates any sharp edges. At the juncture between the peripheral wall 36 and the flange 40, the flange 40 is downwardly offset as at 44 which engages the interior of the bead 22 as illustrated in FIG. 2 thus centralizing the peripheral wall 36 of the charcoal liner or pan 34 in relation to the peripheral wall 18 of the base pan 12 thus providing for air circulation up through the opening 24 and around the periphery of the charcoal liner or pan.

A quantity of charcoal briquettes 46 are positioned in the charcoal liner or pan 34 and combustion supporting air is supplied to the briquettes through a plurality of circumferentially spaced openings 48 in the peripheral wall 36 of the charcoal liner or pan 34 and through a plurality of radially extending louver-type slots 50 in the bottom 38 of the charcoal liner or pan 34. The louver-like slots are formed by forming a radial slit and the deflecting one edge of the slit upwardly so that the slot has a substantial vertical dimension for passage of air but has a very minimal lateral dimension so that the charcoal will be retained in the pan and will not drop vertically downwardly onto the upper surface of the base pan 12. This assures that ashes produced by the burning charcoal will not fill the area between the bottom 20 of the base pan 12 and the bottom 38 of the charcoal liner 34 which would tend to restrict the inflow of combustion supporting air.

The main body 14 includes a cylindrical wall 52 having an inwardly rolled bead 54 at the lower edge and an inwardly rolled bead 56 at the upper edge and a pair of diametrically opposed, radially extending handles 58 adjacent the upper end thereof. The handles 58 are of glass filled nylon or other molded plastic type material, wood or similar material which will not become hot to the touch and are of knob-like configuration with a reduced end of each handle fitting flush against the wall 52 and secured in place by a screw type fastener 60 extending through the wall. Disposed interiorly of the wall 52 is a water pan 62, a lower grille 64 and an upper grille 66. The water pan includes a peripheral outwardly extending flange 68 at its upper edge and each of the grilles includes a peripheral wire 70 and a plurality of parallel, spaced wires 72 rigidly secured thereto. The water pan 62 and the grilles are supported by three equally spaced, vertically disposed channel members 74 fixed to the wall 52 in any suitable manner with one flange of the channel member 74 including a pair of vertically spaced, radially, inwardly extending clips 76 each of which is provided with a lower and inwardly disposed supporting ledge 78 having its outer edge defined by a vertical edge 80 and a second supporting ledge 82 radially outwardly of the ledge 78 with the outer limit the ledge 82 being defined by a vertical edge 84. The upper edge of the upper clip 76, designated by numeral 86 also provides a supporting ledge immediately adjacent the upper rolled edge 56 of the wall 52. With this construction, the water pan 62 is supported on the lower set of clips and on the lower and inner ledges 78 with the lower grille 64 being supported on the lower set of clips on the ledges 82 thus positioning the lower grille spaced from but adjacent the open upper end of the water pan. The upper grille 66 is supported on the upper and outer ledges 82 of the upper clips 76. Alternatively, only one grille may be used such as by removing the lower grille or by removing the upper grille and if desired, the water pan may be supported adjacent the upper grille when only the upper grille is used. This construction provides for passage of hot gases, smoke and the like upwardly peripherally of the water pan inasmuch as the flange 68 of the water pan is spaced substantially and concentrically from the wall 52 and the heat engaging the bottom of the water pan will vaporize some of the quantity of water 88 in the water pan 62.

The dome-like lid 16 includes a cylindrical peripheral wall 90 having a plurality of reinforcing ridges 92 formed therein adjacent the lower end and an inwardly curving dome 94 forming a closure for the upper end. A heat indicator and handle assembly 96 is attached to the center of the dome 94 and includes a heat indicator 98 therein which includes a heat sensing probe 100 extending interiorly of the dome 94 as illustrated in FIG. 2 with the handle 96 being the same in shape and configuration as the handles 58 and being secured to the dome 94 in the same manner with the fastener 60 actually defining the inner end of the probe by contact therewith.

Figure 6:
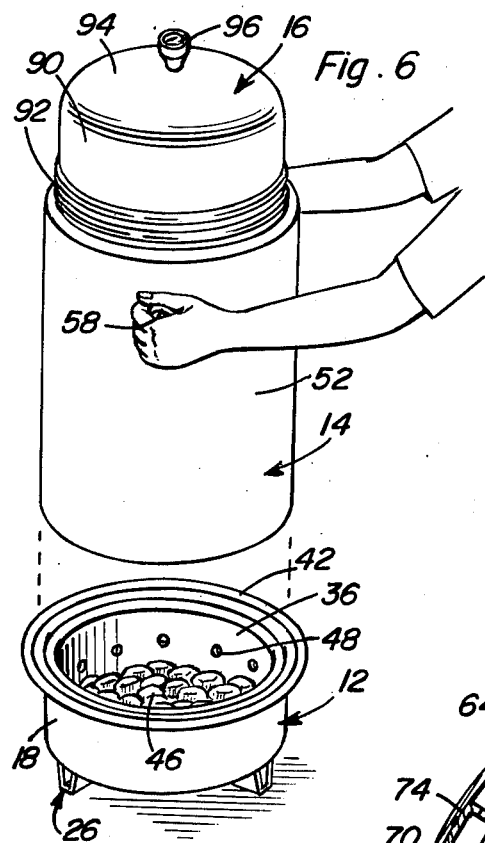
FIG. 6 is a perspective view illustrating the manner in which the main body, water pan, grilles and lid are lifted off of the charcoal liner or pan and the base pan in order to replenish the charcoal briquettes in the charcoal liner.
Figure 5:
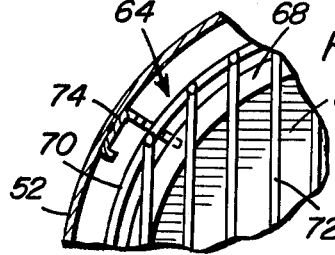
FIG. 5 is a fragmental sectional view taken substantially upon a plane passing along section line 5—5 of FIG. 2 illustrating further structural details of the supporting clip and the manner in which the channel is associated with the main body.
Figure 4:
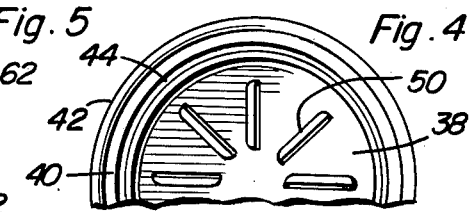
FIG. 4 is a fragmental plan view of the charcoal liner or pan illustrating the radial louver-type slots therein.

FIG. 6 illustrates the manner in which the entire main body 14 and the water pan, grilles and dome lid 16 may be lifted off of the base pan and charcoal liner so that the supply of charcoal briquettes 46 may be replenished if desired. The two handles 58 are diametrically opposed and are located adjacent the upper end of the wall 52 so that the weight of the water in the water pan and any meat items on the lower grille will serve to maintain the removed components in substantially vertical position. This eliminates food items from being accidentally dropped onto supporting surfaces and the like and enables the charcoal briquettes to be replenished when necessary. The lower edge of the dome lid 16 rests on the upper supporting ledge 86 of the upper set of clips 76 and these clips also will provide a support for the base pan and charcoal liner when it is desired to use the device as a conventional charcoal cooker. When this use is contemplated, the dome and upper grille is removed and the main body placed with the lower end on a supporting surface and the base pan and charcoal liner are then placed on the upper end of the main body. A grille may then be placed in the downwardly offset portion 44 in the flange 40 and the device used as a conventional charcoal grille.

While dimensions of the device may vary, in actual practice, the overall height of a double grille unit as shown, when assembled is approximately 44 inches and has a diameter of 17 inches. Such a unit enables a maximum of approximately 15 pounds of charcoal briquettes to be placed in the charcoal liner and pan and the water pan is capable of receiving up to approximately 8 quarts of water. This enables various types of meat items to be cooked. For example, using maximum charcoal and water capacity, a beef roast of 10 to 13 pounds may be cooked with the cooking time being approximately 8 to 9 hours. If desired, sticks or chips of wood such as hickory, pecan and the like may be placed in with the charcoal to introduce a desired flavor characteristic to the meat. Various types of meat items may be cooked such as pork roasts, ribs, hams, poultry, seafood, pork chops, sausage, lamb roasts, steaks, ground beef patties and the like. Also, one of the significant factors involved is the elimination of the necessity of basting or turning the meat items as they are being cooked which is facilitated because the hot coals are separated from the meat by water so that the meat is, in effect, self-basting. In addition, vegetables of various types may be cooked in the water pan and many vegetables may be cooked on the grille. Also, meat drippings in the water pan may be collected as a base for gravy or barbecue sauce which may be obtained by adding various herbs, spices, wines and the like. Various seasonings may be employed for the items being cooked with one of the significant factors of this invention involving the fact that once the cooking operation has started, the dome is not removed and normally the entire assembly remains assembled during the entire cooking operation but if for some reason, additional charcoal is needed, it may be added at any time by merely lifting up the main body and all of its associated components as illustrated in FIG. 6. Also, if the heat indicator registers that the interior of the cooker is too hot, the temperature thereof may be easily reduced by temporarily removing the lid.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A charcoal-water smoker and cooker comprising a vertically disposed housing comprising a separable main body, supporting base and lid oriented in vertically superimposed relation with the base disposed under the main body and the lid supported on the main body, said base including a fuel receiving pan, said main body including a water pan and a grille disposed above the water pan for receiving food items, said water pan being spaced inwardly of the periphery of the main body to enable passage of smoke and heat upwardly between the pan and main body with the heat vaporizing water in the pan for smoking and cooking the food items on the grille, handle means adjacent the upper end of the main body to enable the main body and lid along with the water pan and grille to be lifted off of the base as a unit with the fuel receiving pan remaining stationary thereby enabling the supply of fuel to be replenished without disturbing the water pan, grille and food items thereon from their position in the main body, the major weight components of the main body including the water pan and grille being disposed so that the center of gravity of the combined unit is substantially below the handle means in order to facilitate retention of the lifted unit in vertical orientation, said base including a base pan having supporting legs thereon, said fuel receiving pan being in the form of a liner adapted to receive a quantity of charcoal and supported in concentric spaced relation to the base pan and including a generally horizontal outwardly extending peripheral flange overlying and supported on the base pan with the bottom of the liner spaced from the bottom of the base pan, said liner including openings in the bottom and peripheral wall thereof to provide passage for combustion supporting air, the bottom of said base pan including combustion supporting air inlet means therein, said main body including a lower edge freely resting on the flange of the charcoal receiving liner generally in vertical alignment with the upper edge of the base pan.

2. The structure as defined in claim 1 wherein said handle means includes a pair of diametrically disposed, radially extending handles adjacent the upper end of the main body, said lid including a dome-shaped member having a handle in the center upper end portion thereof, said handle on the lid including a heat indicator incorporated therein.

3. The structure as defined in claim 2 wherein said main body includes a peripheral wall, a plurality of supporting clips on the inner surface of the peripheral wall for supporting engagement with the water pan and grille.

4. The structure as defined in claim 3 wherein each of said clips includes a plurality of vertically spaced and radially spaced ledges with the innermost and lowest ledges adapted to support the water pan and the adjacent upper and outer ledge adapted to support a grille.

5. The structure as defined in claim 4 wherein said water pan includes a peripheral flange resting on the lowermost and innermost ledges, the clips being arranged in two vertically spaced sets with the uppermost clips being immediately adjacent the upper end of the main body, the lower edge of the lid telescoped interiorly of the upper end of the main body and supported solely on the uppermost clips.

6. The structure as defined in claim 5 wherein said pan and grille are supported at the lower set of clips, a second grille supported by the upper set of clips thereby enabling food items to be placed on both grilles, the flange on the water pan and the water pan itself serving to collect grease drippings from cooking meat positioned on the grille or grilles.

7. The structure as defined in claim 6 wherein said main body, supporting base and lid are of cylindrical configuration and of substantially the same diameter, the outer edge of the flange on the charcoal receiving liner including an upwardly projecting bead to guide and locate the lower end of the main body in relation to the flange, the lower surface of said flange having a downwardly offset peripheral portion engaged with the interior of the top edge of the base pan to centralize the liner with respect to the base pan, said handles being constructed of material other than metal which will not become excessively hot thereby enabling the main body and lid to be removed at any time during the smoking and cooking operation.

* * * * *